(12) United States Patent
Lin et al.

(10) Patent No.: US 10,219,358 B2
(45) Date of Patent: Feb. 26, 2019

(54) LED CONTROLLER WITH BLUETOOTH

(71) Applicant: Changzhou Jutai Electronic Co., Ltd., Changzhou (CN)

(72) Inventors: Jun Lin, Changzhou (CN); Chengqian Pan, Changzhou (CN); Bin Chen, Changzhou (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 0 days.

(21) Appl. No.: 15/727,618

(22) Filed: Oct. 8, 2017

(65) Prior Publication Data

US 2018/0139824 A1    May 17, 2018

(30) Foreign Application Priority Data

Nov. 14, 2016   (CN) .................... 2016 2 1232377 U

(51) Int. Cl.
| | |
|---|---|
| H05B 37/02 | (2006.01) |
| H05B 33/08 | (2006.01) |
| F21S 4/10 | (2016.01) |
| F21V 23/00 | (2015.01) |
| H04L 12/28 | (2006.01) |

(52) U.S. Cl.
CPC ........... H05B 37/0272 (2013.01); F21S 4/10 (2016.01); F21V 23/001 (2013.01); H05B 33/08 (2013.01); H05B 33/0821 (2013.01); H05B 33/0845 (2013.01); H05B 37/02 (2013.01); *H04L 2012/2841* (2013.01)

(58) Field of Classification Search
CPC ............... H05B 33/08; H05B 33/0845; H05B 33/0857; H05B 37/02; H05B 37/0218; H05B 37/0227; H05B 37/0272; F21V 23/001; F21V 23/02; F21S 4/10; H04L 2012/2841
USPC .... 315/149–159, 185 R, 291–297, 307, 308, 315/312
See application file for complete search history.

(56) References Cited

U.S. PATENT DOCUMENTS

| | | | |
|---|---|---|---|
| 2014/0028209 A1* | 1/2014 | Kitamura | ........... H05B 33/0806 315/200 R |
| 2014/0312773 A1* | 10/2014 | Zulim | ..................... H02H 3/00 315/113 |

* cited by examiner

*Primary Examiner* — Jimmy Vu
(74) *Attorney, Agent, or Firm* — W&K IP (Wayne & King)

(57) ABSTRACT

The utility model discloses a vertical driving power supply for a lamp a LED controller with Bluetooth, comprising a mobile terminal for issuing the manipulation instructions; and a control module with Bluetooth, which is wireless communicating with the mobile terminal, so that the manipulation instructions from the mobile terminal are converted to a control signal that is output; and a driving circuit connected to an output terminal of the control module with Bluetooth, controlling of turn on or off a control signal provided by the control module with Bluetooth. which can improve the intelligent control of the LED lights, and make the operation process more interesting.

5 Claims, 5 Drawing Sheets

LED CONTROLLER WITH BLUETOOTH

CROSS-REFERENCE TO RELATED APPLICATIONS

This application claims priority to Chinese Patent Application No. 201621232377.0 with a filing date of Nov. 14, 2016. The content of the aforementioned applications, including any intervening amendments thereto, are incorporated herein by reference.

TECHNICAL FIELD

The present utility model relates to a LED controller with Bluetooth.

BACKGROUND

The strings of LED lights have a lighting decorative effect at night, due to a variety of shapes and which lights are flashing, while it is also a first choice for people to add the atmosphere. In order to enhance the decorative effect of the strings of lights, a plurality of flash bulbs are usually spaced apart arranged on the strings of lights, such that the whole strings of lights are provided with a dynamic effect of flashing. The flash bulbs in the existing market, if which are directly in series connected to the strings of lights, leading to an unsteadily flashing of the whole strings of lights, which affects that other lights can be normal luminescence, and affects the beauty, and it can not reach the expected results. Moreover, the flash bulbs device consumes a larger current, and the change of the current is larger, which affects the safety of the bulb.

There has been a various light-emitting modes of the LED lights on the market at present, which control the light-emitting modes by a drive circuit, however, at present, the drive circuit controls it in the manner of a button switch, but in the era of intelligent today, a display of the LED lights is not be intelligent.

SUMMARY OF THE INVENTION

In view of the technical problems above mentioned, an object of the present utility model is providing a LED controller with Bluetooth, which can improve the intelligent control of the LED lights, and make the operation process more interesting.

The technical solutions to solve the above technical problems are as follows:

A LED controller with Bluetooth, which is characterized by, comprising a mobile terminal for issuing the manipulation instructions; and a control module with Bluetooth, which is wireless communicating with the mobile terminal, so that the manipulation instructions from the mobile terminal are converted to a control signal that is output; and a driving circuit connected to an output terminal of the control module with Bluetooth, controlling of turn on or off a control signal provided by the control module with Bluetooth.

also comprising an input module, which alters the modes of a string of flash lights of the loaded LED lights and is used to reset a password of the control module with Bluetooth, the input module is electrically connected to the control module with Bluetooth;

the driving circuit is a bridge driving circuit, which including a first transistor, a second transistor, a third transistor, a fourth transistor, a first resistor, a second resistor, a third resistor and a fourth resistor;

a first base of the first transistor is connected to a collector of the fourth transistor by the first resistor, and the base of the first transistor is connected to the output terminal of the DC power supply by the second resistor, and a collector of the first transistor is an output terminal, and a base of the fourth transistor is connected to the output terminal of the control module, and an emitter of the fourth transistor is electrical grounding;

a base of the third transistor is connected to a collector of the second transistor by the third resistor, and the base of the third transistor is connected to the output terminal of the DC power supply by the fourth resistor, and a collector of the third transistor is an output terminal, and a base of the second transistor is connected to the output terminal of the control module, and an emitter of the second transistor is electrical grounding;

an emitter of the first transistor is connected to an emitter of the third transistor, and the collector of the first transistor is connected to the collector of the second transistor, and the collector of the third transistor is connected to the collector of the fourth transistor.

The present utility model is characterized in that the control module with Bluetooth is wireless communicating with a mobile terminal (smart mobile phone) by a wireless communication module, receiving a control signal sent by the mobile terminal, then sending a corresponding control signal to an output port after the internal processing, when without communicating with the mobile terminal, run automatically according to a set mode; the control module with Bluetooth is also responsible for the implementation of the timing and memory function; and the output mode can be changed by short pressing a button switch, such that the LED lights can have different lighting effects; and a password to connect which can be reset by long pressing a button switch.

DETAILED DESCRIPTION

The present utility model will now be described in further detail with reference to the accompanying drawings and specific embodiments.

Figure 1:
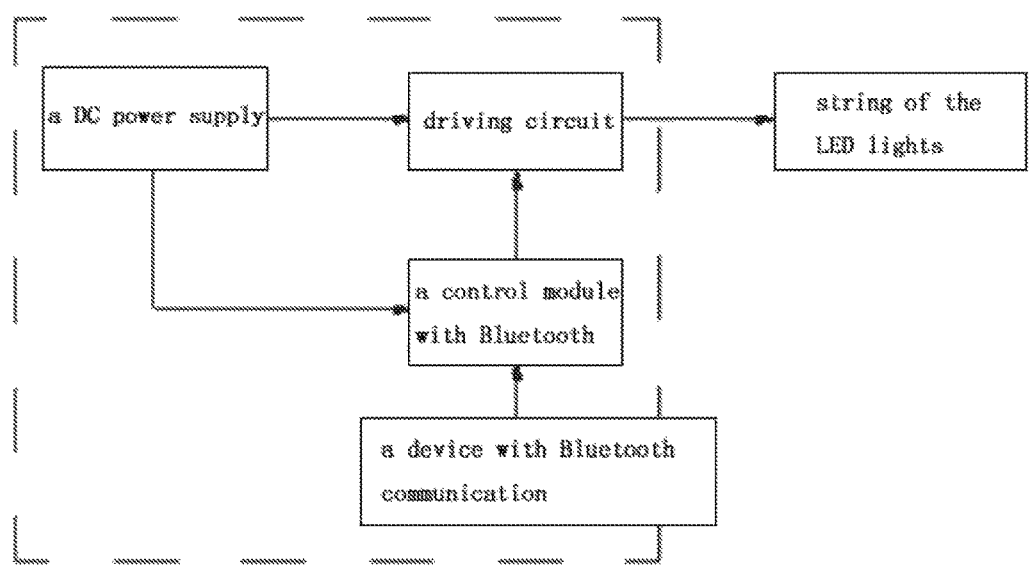
FIG. 1 is a circuit block diagram of a LED controller with Bluetooth.
Figure 2:
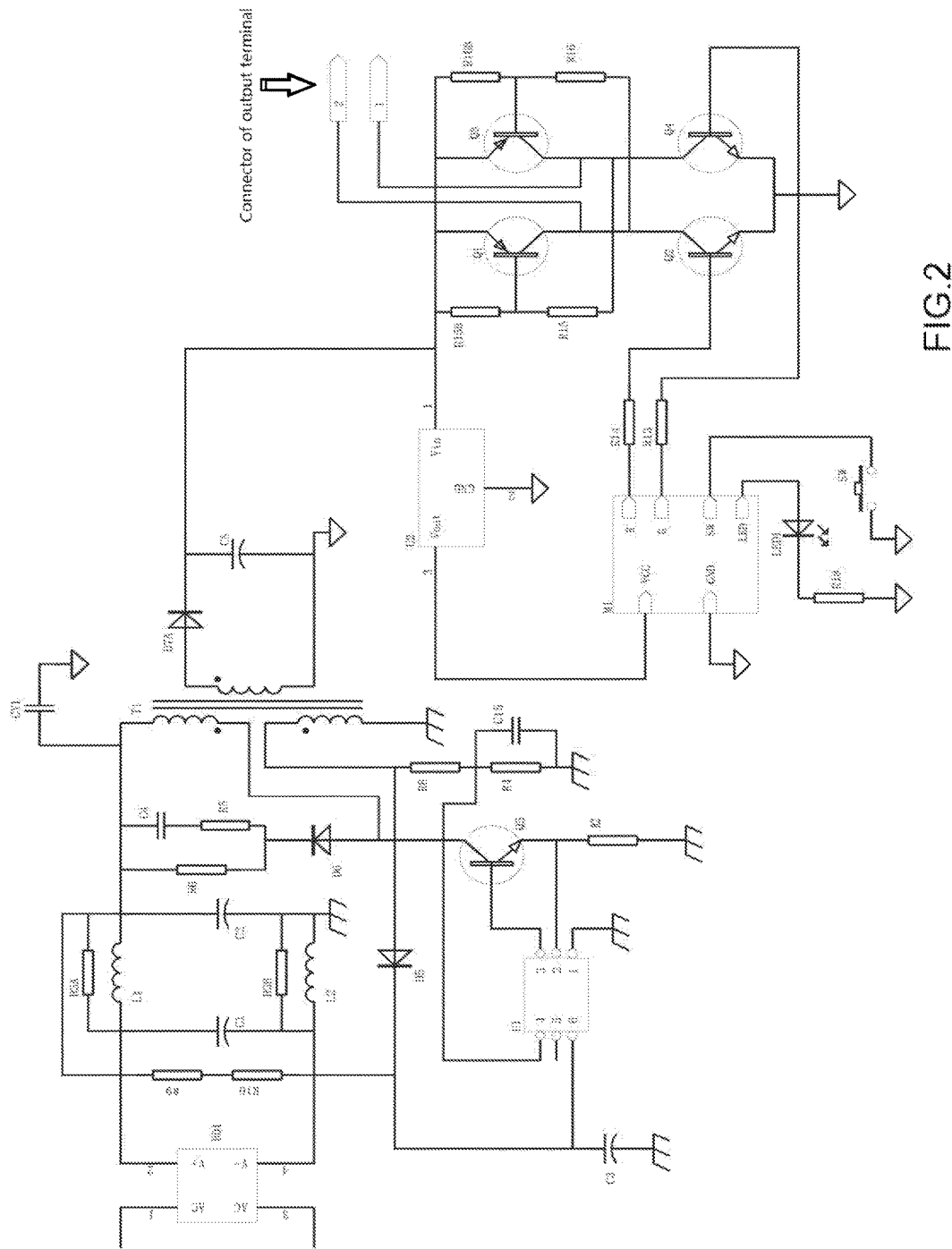
FIG. 2 is a schematic circuit diagram of a first embodiment of FIG. 1.

With a large structure, the LED controller with Bluetooth of the present utility model has at least two embodiments, one embodiment is the form of a built-in DC power supply (e.g. FIG. 1), this built-in DC power supply can not only be a battery integrated inside of the controller, but also can be a DC power supply converting AC to DC power output (as shown in FIG. 2), the other embodiment is the form of a DC power supply external, for example, an output terminal of a AC/DC converter connected to a AC socket is connecting with the controller of the present utility model, to provide the required DC power for the present utility model, the form of external is a battery. Now, the present utility model is described with reference of a built-in DC power supply, which details as follows:

Referring to FIG. 1 to FIG. 2, a LED controller with Bluetooth of the present utility model, comprising a DC power supply 1 outputting DC voltage, a mobile terminal for issuing the manipulation instructions, a control module with Bluetooth, a driving circuit;

Referring to FIG. 1 to FIG. 2, the DC power supply is a battery or a switching mode power supply, in this example, a switching mode power supply is utilized. The switching mode power supply comprises an electric circuit of rectifier and filter, a voltage conversion circuit and a switch control circuit. The DC power supply comprises an electric circuit of rectifier and filter, a voltage conversion circuit and a switch control circuit, an output terminal of the electric circuit of rectifier and filter is electrically connected to the voltage conversion circuit, and the switch control circuit is electrically connected to the electric circuit of rectifier and filter and the voltage conversion circuit, respectively. Referring to FIG. 2, the output terminal of the electric circuit of rectifier and filter is electrically connected to the voltage conversion circuit, the electric circuit of rectifier and filter includes a rectifier chip BD1, a ninth resistor R9, a tenth resistor R10, a first inductance L1, a second inductance L2, a first capacitance C1, a second capacitor C2, a third resistor R3A and a resistor R3B, a positive output terminal of the rectifier chip BD1 is connected with one terminal of the first inductance L1, a negative output terminal of the rectifier chip BD1 is connected with one terminal of the second inductance L2, both terminals of the first capacitor C1 are connected to the positive output terminal and the negative output terminal of the rectifier chip BD1, respectively, the other terminal of the first inductance L1 and the other terminal of the second inductance L2 is connected to each other by the second capacitor C2, the third resistor R3A is in parallel connected at both terminals of the first inductance L1, and the resistor R3B is in parallel connected at both terminals of the second inductance L2. The voltage conversion circuit is a transformer T1, converting the high voltage to the low voltage. The DC power supply also comprises a rectifier diode D7A and a capacitor C5, the anode terminal of the rectifier diode D7A is connected to the output terminal of the voltage conversion circuit, and the cathode terminal of the rectifier diode D7A is connected to one terminal of the capacitor C5, the other terminal of the capacitor C5 is electrical grounding. After rectified by the diode D7A, the secondary output voltage of the transformer T1 is transformed to the DC voltage on the capacitor C5, and the DC voltage is sent to the control module with Bluetooth via a voltage stabilizing circuit.

The switch control circuit is electrically connected to the electric circuit of rectifier and filter and the voltage conversion circuit, respectively. The switch control circuit comprises a power supply control chip U1, a triode Q5, a second resistor R2, a fourth resistor R4, a fifth resistor R5, a sixth resistor R6, an eighth resistor R8, a fourth capacitor C4, a fifteenth capacitor C15, a sixth diode D6 and a fifth diode D5, one terminal of the sixth resistor R6 is connected to the first inductance L1, a branch formed by the series connection of the fourth capacitor C4 and the fifth resistor R5 is in parallel connected at both terminals of the sixth resistance R6, and the other terminal of the sixth resistor R6 is connected to the cathode terminal of the sixth diode D6, and the anode terminal of the sixth diode D6 is connected to a collector of the triode Q5, and the collector of the triode Q5 is also connected to the transformer T1, and a base electrode of the triode Q5 is connected to an output terminal of the power supply control chip U1, and an emitter of the triode Q5 is electrical grounding by the second resistor R2. An input terminal of the power supply control chip U1 is connected to one terminal of the fourth resistor R4, and the other terminal of the fourth resistor R4 is electrical grounding, and both terminals of the fifteenth capacitor are in parallel connected at both terminals of the fourth resistor R4, and one terminal of the eighth resistor R8 is connected to the fourth resistor, and the other terminal of the eighth resistor R8 is connected to the transformer T1. The power supply control chip U1 employs the PWM IC, for example, SF6010, SF6070, SF5928, OB2520, etc. A voltage signal of a primary winding of the transformer is obtained by sampling from the primary winding of the transformer T1, the voltage signal is compared with an output voltage value set inside of the power supply control chip U1, if they are not equal, the power control chip U1 outputs an control signal, and a voltage value of the primary winding of the transformer is changed by turn on and off of the triode.

The mobile terminal is used for issuing the manipulation instructions, preferably, the mobile terminal is an intelligent mobile phone, which can be connected with a plurality of LED drive powers with the wireless communication control functions simultaneously by an APP software, which can control them separately, but also can control them in groups; the control includes: switching of the LED lights, adjustment of the brightness, the modes setting, modifying the password and multiple sets of timing settings etc. A control module M1 with Bluetooth is wireless communicating with the mobile terminal, such that the manipulation instructions sent from the mobile terminal will be converted to an control signal output. The control module with Bluetooth is used for wireless communicating with the intelligent mobile phone, receiving the control signal sent by the intelligent mobile phone, then sending a corresponding control signal to an output port after the internal processing, when without communicating with the intelligent mobile phone, run automatically according to a set mode; the control module with Bluetooth is also responsible for the implementation of the timing and memory function.

The driving circuit is connected to the output terminal of the control module with Bluetooth, in order to controlling of turn on or off a control signal provided by the control module with Bluetooth. The driving circuit of the embodiment preferably choose a bridge driving circuit, which is connected to the output terminal of the control module with Bluetooth, so that the DC power outputted by the DC power supply is converted to the non sinusoidal alternating current controlled precisely according to a control signal provided by the control module with Bluetooth. The bridge drive circuit includes a first triode Q1, a second triode Q2, a third triode Q3, a fourth triode Q4, a first resistor R15, a second resistor R15B, a third resistor R16, a fourth resistor 16B; a base electrode of the first triode Q1 is connected to a collector of the fourth triode Q4 by the first resistor R15, and a base electrode of the first triode Q1 is connected to the output terminal of the DC power supply by the second resistor R15B, and a collector of the first triode Q1 is an output terminal, and a base electrode of the fourth triode Q4 is connected to the output terminal G of the control module by the resistor R13, and an emitter of the fourth triode Q4 is electrical grounding. A base electrode of the third triode Q3 is connected to a collector of the second triode Q2 by the third resistor R16, and a base electrode of the third triode is connected to the output terminal of the DC power supply by the fourth resistor R16B, and a collector of the third triode Q3 is an output terminal. A base electrode of the second triode Q2 is connected to the output terminal R of the control module by the resistor R14, and an emitter of the second triode Q2 is electrical grounding. An emitter of the first triode Q1 is connected to an emitter of the third triode Q3, and a collector emitter of the first triode Q1 is connected to a collector of the second triode Q2, and a collector emitter of the third triode Q3 is connected to a collector of the fourth triode Q4.

Preferably, there is also comprising a voltage regulator circuit, supplying the DC power outputted by the DC power supply that after the voltage has been stabilized to the control module with Bluetooth, the voltage regulator circuit is connected between the DC power supply and the control module with Bluetooth. The voltage regulator circuit is a three-terminal voltage regulator U2. The three-terminal voltage regulator U2 provides a stable voltage source to the control module M1 with Bluetooth, to supply power to the internal control chip.

Preferably, there is also comprising an input module, which alters the modes of a string of flash lights of the loaded LED lights and is used to reset a password of the control module with Bluetooth, the input module is electrically connected to the control module M1 with Bluetooth. The input module is a button switch SW, and the output mode can be changed by short pressing the button switch, such that the LED lights can have different lighting effects; and a password to connect which can be reset by long pressing the button switch.

The working process of the present utility model is as follows:

1. after starting, the DC power supply goes into operation firstly, the DC voltage is created on the fifth capacitor C5;

2. the DC voltage supplies power to the control module M1 with Bluetooth by the three-terminal voltage regulator U2;

3. the control module M1 with Bluetooth goes into operation, while starting to allow for receiving a control signal of wireless communication sent by a device with Bluetooth function, when the signal sent by the device with Bluetooth function is not received, the control module M1 with Bluetooth runs in automatic mode, the control module M1 with Bluetooth outputs the control signal through the bridge driving circuit controlled by the thirteenth resistor R13 and the fourteenth resistor R14, such that the brightness of the strings of the lights is changed;

4. the device with Bluetooth function opens the corresponding APP software, after connected to the control module with Bluetooth, can issue the instructions using the device with Bluetooth function, to complete the functions of adjusting the brightness, setting the alarm, setting the lights flash modes, multi devices in group, modifying the password, and flashing according to the music on the equipment etc.;

5. the output mode can be changed by short pressing the button switch, and a password to connect which can be reset by long pressing the button switch.

Figure 3:
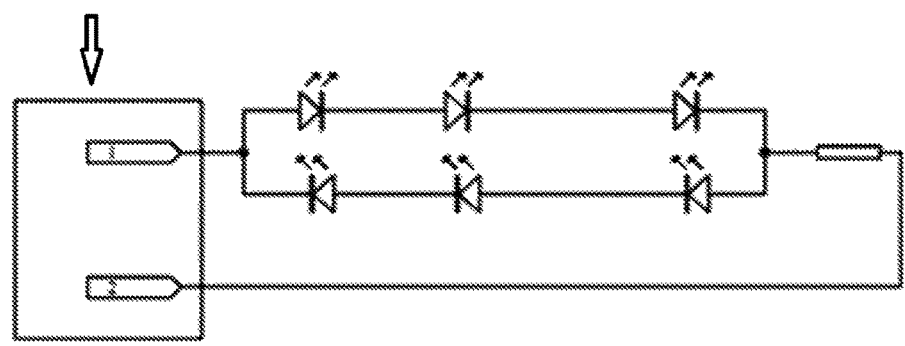
FIG. 3 is a schematic diagram of a first load connected to an output terminal of the first embodiment (FIG. 2)

The load of the controllers of the embodiments above-described is suitable for connecting with the string of LED lights shown in FIG. 3, and a selection signal is provided by the button switch SW, and select one time that forces to enter the next lighting effect. 8 types of lighting effects of the string of LED lights commonly used are as follows, but also can achieve different lighting effects by modifying the software programs of the Bluetooth modules.

No. 1: various combinations. That is, the functions of No. 1 to No. 7 cyclic change automatically according to the order (Combination);

No. 2: automatic changes of the wave forward and backward (In Waves). The way to realize it is that: the duty ratio of the first output terminal of the control module is slowly varying from 0% to D_Max, then slowly varying from D_Max to 0%, and the duty ratio of the second output terminal of the control module is also slowly varying from 0% to D_Max, then slowly varying from D_Max to 0%, but a phase difference of the brightness of the first output terminal and the second output terminal of the control module is 180 degrees. The lighting effects are specifically presented that when a first string of the lights are changed from light to dark, then a second string of the lights are changed from dark to light.

No. 3: horse-racing type automatic changes (Sequential). The way to realize it is that: the duty ratio of the first output terminal of the control module is D_Max, the duty ratio of the second output terminal of the control module is 0%, after continuing a few cycles, then the duty ratio of the first output terminal of the control module is 0%, while the duty ratio of the second output terminal of the control module is D_Max, after continuing a few cycles, then the duty ratio of the second output terminal of the control module is 0%, while the duty ratio of the first output terminal of the control module is D_Max, and so on. The lighting effects are specifically presented that the first string of the lights and the second string of the lights are shining alternately;

No. 4: a single light gradually fades out and automatically changes (three speeds transform) (SLO-GLO). The way to realize it is that: the duty ratio of the first output terminal of the control module is slowly varying from 0% to D_Max, then slowly varying from D_Max to 0%, and then the duty ratio of the second output terminal of the control module is also slowly varying from 0% to D_Max, then slowly varying from D_Max to 0%. After that, it is the change of the first output of the control module, and so on. The effect is: the first string of the lights are changed from dark to light to dark, then the second string of the lights are changed from dark to light to dark, then the first string of the lights change. The lighting effects are specifically presented that two sets of load lights gradually fade alternately.

No. 5: horse-racing type forward and backward with the stars flash and automatically change (Chasing/Flash). The way to realize it is that: the No. 3 and the No. 7 are combined, and which two types of effects are carried out alternately.

No. 6: two lights gradually fade out and automatically changes (three speeds transform) (Slow Fade), the way to realize it is that: the duty ratios of the first output terminal and the second output terminal of the control module are slowly varying from 0% to D_Max simultaneously, then slowly varying from D_Max to 0%, and the cycle continues. The lighting effects are specifically presented that the first string of the lights and the second string of the lights gradually fade simultaneously.

No. 7: the stars flash with horse-racing type automatically change (Twinkle/Flash). The way to realize it is that: the duty ratio of the first output terminal of the control module is D_Max, after continuing a few cycles, then the duty ratio of the first output terminal of the control module is 0%, then the duty ratio of the first output terminal of the control module is D_Max again, after continuing a few cycles and cycling several times, in turn the second output terminal of the control module is in the same way. The lighting effects are specifically presented that the first string of the lights are bright and dark with blinking several times, and then in turn the second string of the lights are bright and dark with blinking several times, that is two sets of lights flash alternately.

No. 8: LED fixing always on (Steady On), the way to realize it is that: the duty ratios of the first output terminal and the second output terminal of the control module both are D_Max. The lighting effects are specifically presented that two sets of load lights are always on.

Figure 4:
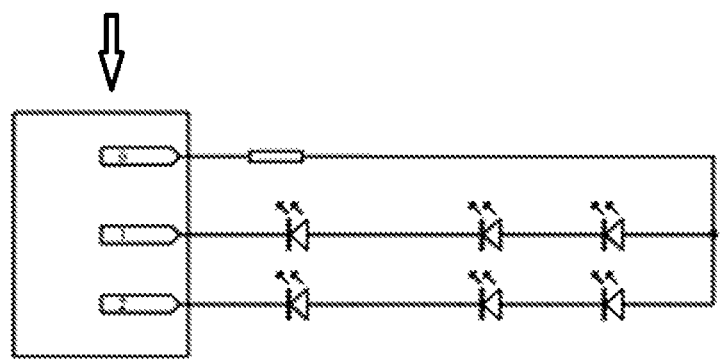
FIG. 4 is a schematic diagram of a second load connected to an output terminal of the second embodiment (FIG. 5)
Figure 5:
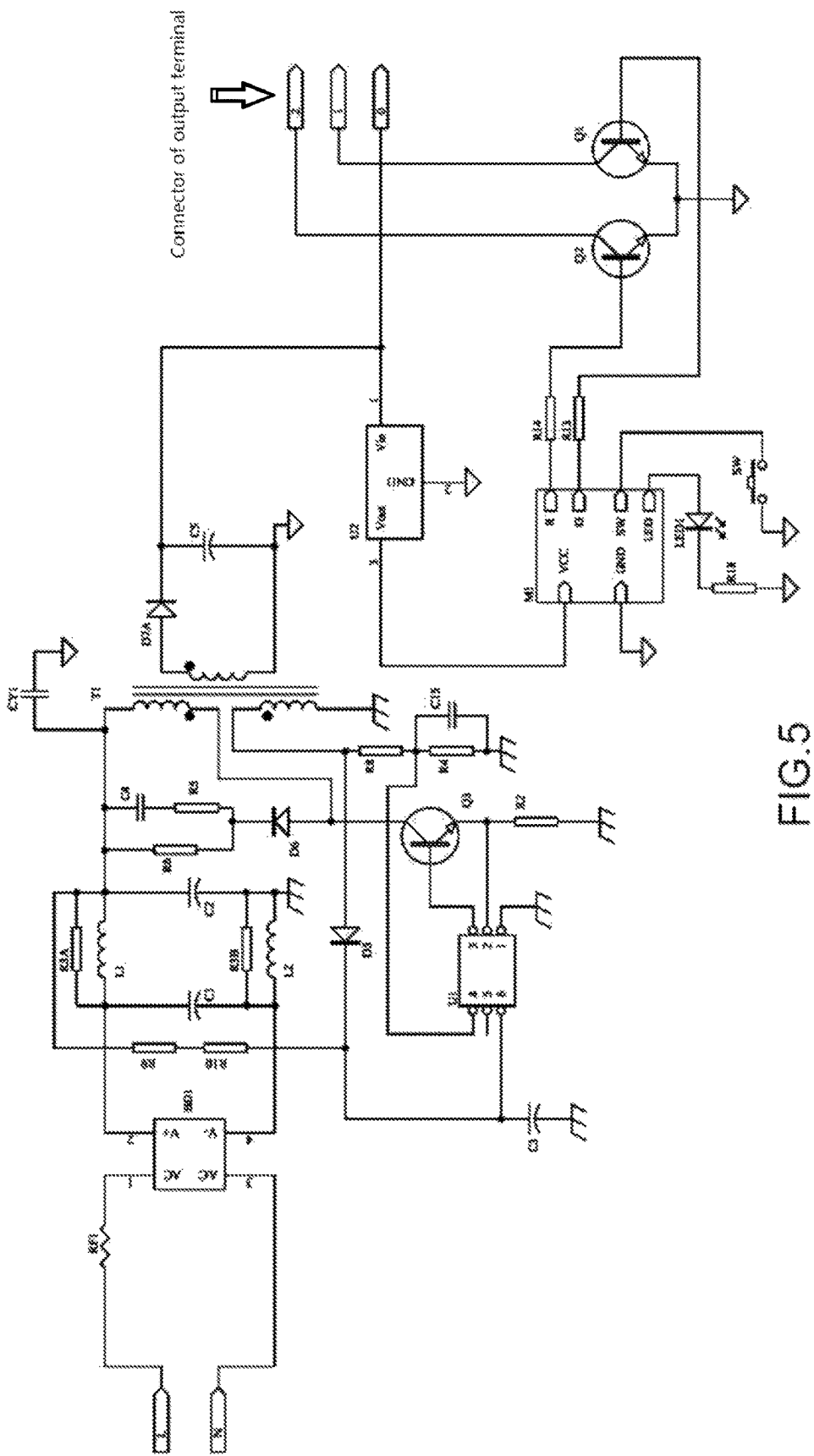
FIG. 5 is a schematic circuit diagram of a second embodiment of FIG. 1.

The driving circuit of the embodiment is not limited to the bridge driving circuit of the embodiments above-described, but also can use a driving circuit consisted of two transistor. The No. 0 terminal in FIG. 5 outputs the high level, and No. 1 and No. 2 terminals output the low level, and the driving circuit in FIG. 5 is suitable for connecting with the load shown in FIG. 4, when the control module with Bluetooth controls that the first triode Q1 is conducted, the No. 1 terminal outputs the low level, then the string of the LED lights connected with the No. 1 terminal that and the No. 0 terminal together form a loop and which is lighten, and when the control module with Bluetooth controls that the second triode Q2 is conducted, the No. 2 terminal outputs the low level, then the string of the LED lights connected with the No. 2 terminal that and the No. 0 terminal together form a loop and which is lighten.

We claim:

1. A LED controller with Bluetooth, comprising:
   a mobile terminal for issuing the manipulation instructions; and
   a control module with Bluetooth, which is wireless communicating with the mobile terminal, so that the manipulation instructions from the mobile terminal are converted to a control signal that is output; and
   a driving circuit connected to an output terminal of the control module with Bluetooth, controlling of turn on or off a control signal provided by the control module with Bluetooth,
   also comprising an input module, which alters the modes of a string of flash lights of the loaded LED lights and is used to reset a password of the control module with Bluetooth, the input module is electrically connected to the control module with Bluetooth;
   the driving circuit is a bridge driving circuit, which including a first transistor, a second transistor, a third transistor, a fourth transistor, a first resistor, a second resistor, a third resistor and a fourth resistor;
   a first base of the first transistor is connected to a collector of the fourth transistor by the first resistor, and the base of the first transistor is connected to a output terminal of a DC power supply by the second resistor, and a collector of the first transistor is an output terminal, and a base of the fourth transistor is connected to the output terminal of the control module, and an emitter of the fourth transistor is electrical grounding;
   a base of the third transistor is connected to a collector of the second transistor by the third resistor, and the base of the third transistor is connected to the output terminal of the DC power supply by the fourth resistor, and a collector of the third transistor is an output terminal, and a base of the second transistor is connected to the output terminal of the control module, and an emitter of the second transistor is electrical grounding;
   an emitter of the first transistor is connected to an emitter of the third transistor, and the collector of the first transistor is connected to the collector of the second transistor, and the collector of the third transistor is connected to the collector of the fourth transistor.

2. A LED controller with Bluetooth according to claim 1, further comprising a DC power supply outputting the DC voltage; and
   a voltage regulator circuit, supplying the DC voltage outputted by the DC power supply that after the voltage has been stabilized to the control module with Bluetooth, the voltage regulator circuit is connected between the DC power supply and the control module with Bluetooth.

3. A LED controller with Bluetooth according to claim 1, the input module is a button switch.

4. A LED controller with Bluetooth according to claim 1, wherein the DC power supply includes an electric circuit of rectifier and filter, a voltage conversion circuit and a switch control circuit, an output terminal of the electric circuit of rectifier and filter is electrically connected to the voltage conversion circuit, and the switch control circuit is electrically connected to the electric circuit of rectifier and filter and the voltage conversion circuit, respectively.

5. A LED controller with Bluetooth according to claim 4, wherein the DC power supply further includes a rectifier diode and a capacitor, an anode terminal of the rectifier diode is connected to an output terminal of the voltage conversion circuit, and a cathode terminal of the rectifier diode is connected to one terminal of the capacitor, and the other terminal of the capacitor is electrical grounding.

* * * * *